(No Model.) 2 Sheets—Sheet 1.
D. W. BOVEE.
HARVESTER.
No. 296,120. Patented Apr. 1, 1884.
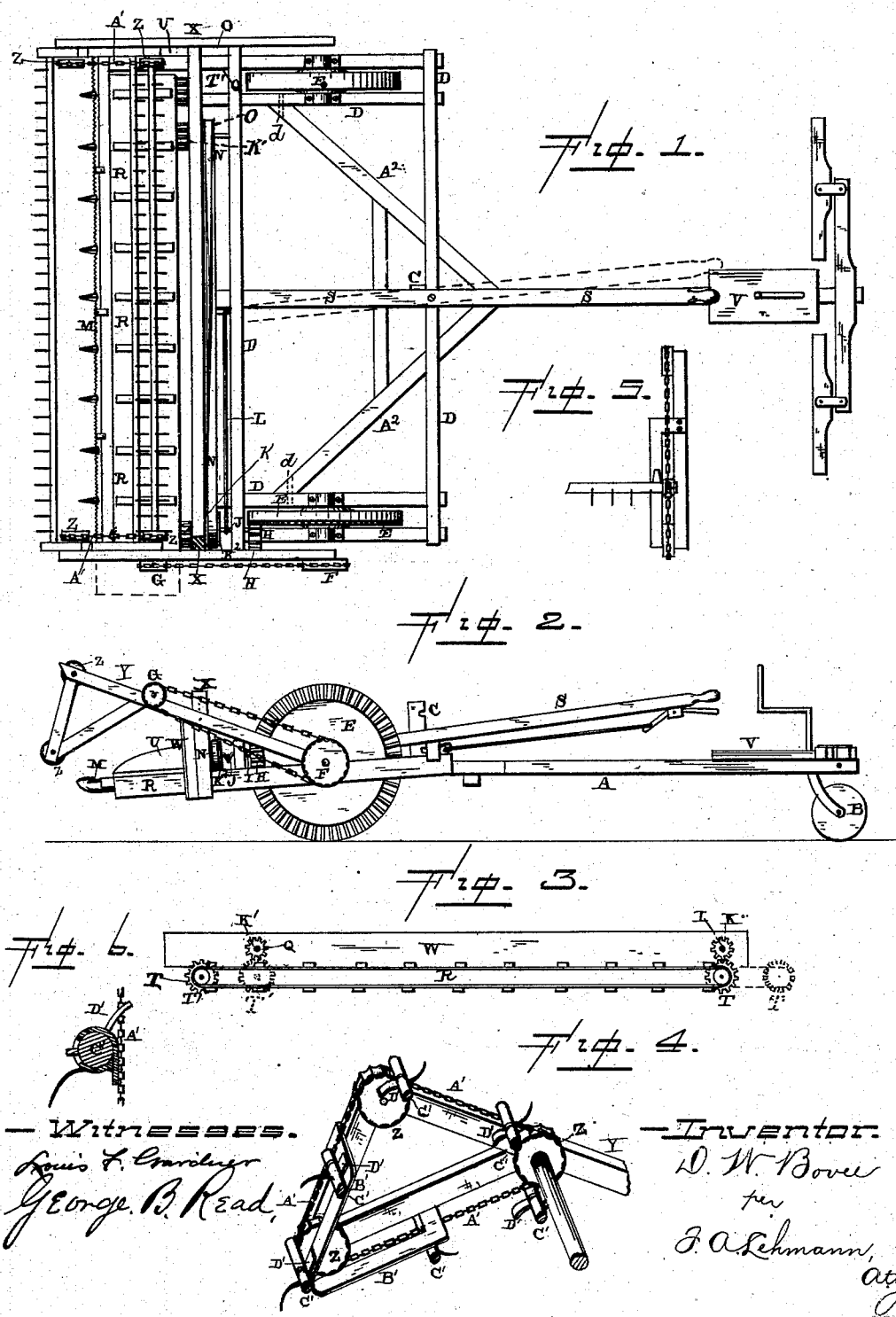

(No Model.) 2 Sheets—Sheet 2.
D. W. BOVEE.
HARVESTER.
No. 296,120. Patented Apr. 1, 1884.
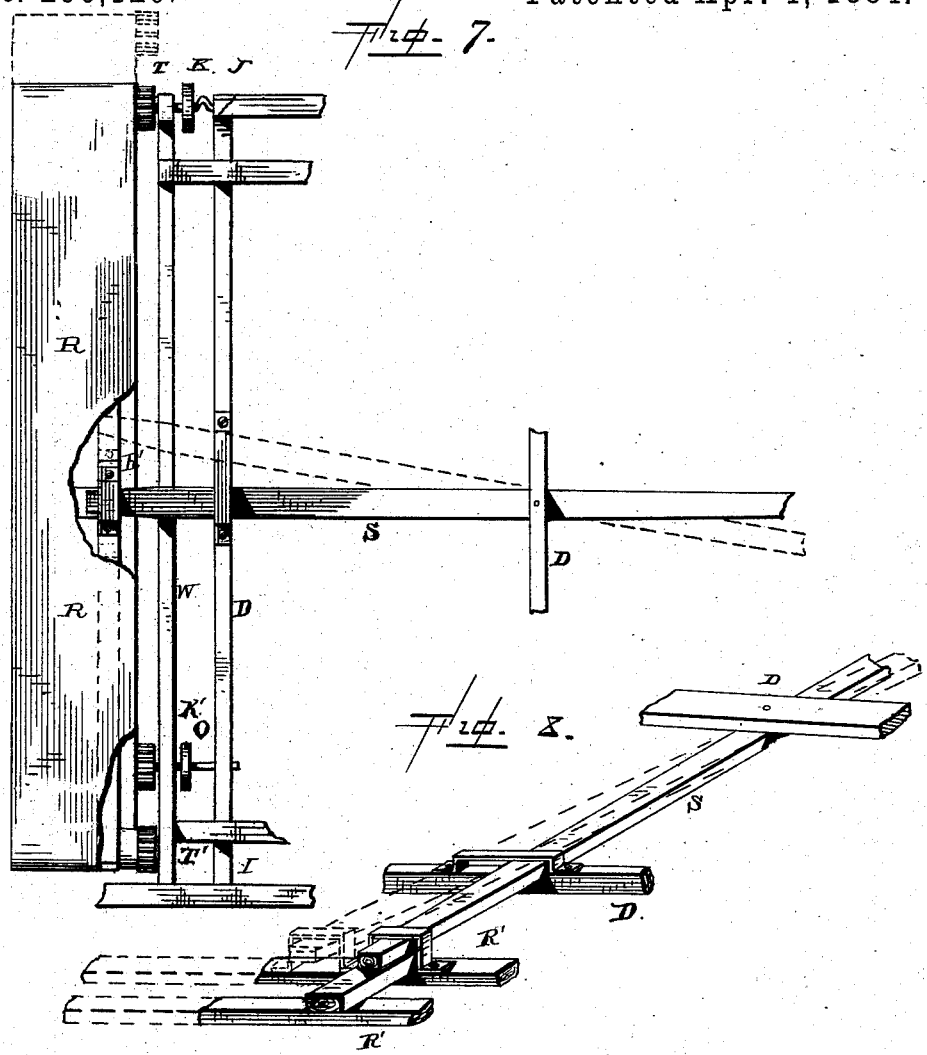

UNITED STATES PATENT OFFICE.

DAVID WILLIAM BOVEE, OF RICHLAND CENTRE, WISCONSIN.

HARVESTER.

SPECIFICATION forming part of Letters Patent No. 296,120, dated April 1, 1884.

Application filed March 31, 1883. (No model.)

*To all whom it may concern:*

Be it known that I, DAVID W. BOVEE, of Richland Centre, in the county of Richland and State of Wisconsin, have invented certain new and useful Improvements in Reapers; and I do hereby declare the following to be a full, clear, and exact description of the invention, such as will enable others skilled in the art to which it pertains to make and use it, reference being had to the accompanying drawings, which form part of this specification.

My invention relates to an improvement in reapers; and it consists, first, in a laterally-adjustable endless belt or apron, whereby the apron can be adjusted so as to drop the swath from either end; second, in the combination of a laterally-adjustable apron with a lever which is made to perform the double function of laterally adjusting the apron and raising and lowering the sickle; third, in a laterally-adjustable apron which is provided with an operating shaft and pinion at each end, with driving mechanisms which are placed upon opposite sides or ends of the frame, whereby the apron can be made to revolve in either direction; fourth, the combination of a reel and a means for causing the teeth to enter the grain in a vertical position, and causing the reel to move the grain back a suitable distance upon the apron, when the reel turns backward so as to no longer affect the grain, all of which will be more fully described hereinafter.

The object of my invention is to produce a reaper which is constructed upon the same plan as a header, and which is provided with a laterally-movable apron, so that one swath can be deposited with another as the machine is driven across the field, and thus save one-half of the labor in gathering two swaths, either by means of a combined hay-rake and loader or by manual labor.

Figure 1 is a plan view of my invention complete. Fig. 2 is a side elevation. Fig. 3 is a detail view, being a front elevation of the endless apron and the mechanism for operating it. Figs. 4, 5, and 6 are enlarged detail views of the reel. Fig. 7 is a detached inverted plan view of the endless-apron frame and the lever for moving it. Fig. 8 is a perspective view of the operating-lever and a portion of the frame of the endless apron.

A represents the tongue, which is supported at the rear end, where the double-tree is attached to it, by means of a ground-wheel, B, in the usual manner. To the front of this tongue is secured a triangular frame, A², which forms a support for the ratchet-bar C, and which is pivoted at its front ends, at $d$ $d$, to the inner sides of the harvester-frame D. This harvester-frame may either be constructed as here shown or in any other way that may be preferred, for I do not limit myself in this respect. This frame D is supported by the wheels E, which may be of any desired size, one of which has cogs formed upon it for the purpose of operating the endless belt or carrier. To the shaft of this cogged wheel E will also be secured the wheel or pulley F, from which will pass the chain or belt over the wheel or pulley G for operating the reel. Meshing with this wheel E is a pinion, H, which is mounted upon one end of the crank-shaft I, which shaft is provided with a driving-crank, J, and a pinion, K. From the crank J upon this shaft I extends the pitman L, which operates the cutter M in the usual manner. From a pulley, K², on shaft I extends the crossed belt N across the frame D, and around a corresponding pulley, O, upon the opposite side of the frame. This pulley O is placed upon a shaft, Q, which corresponds to the one I, and also has a pinion, K', upon its inner end. While the machine is in motion these two pulleys K² O are made to constantly revolve; but as the belt N, which connects them, is crossed, they move in opposite directions.

In the front part of the frame D, just back of the cutter M, is placed the adjustable apron R, upon which the grain falls, for the purpose of being carried to one side of the machine and dropped upon the ground. This apron differs in its construction in no wise from those heretofore used for a similar purpose, with the exception that the frame R', around which the apron passes, instead of being stationary, is here made to move freely back and forth by means of the lever S. Each of the rollers placed in the frame R' at the end of this endless band or apron R is provided with a pinion, T or T', so that no matter toward which end of the frame D the apron may be moved by the lever S, it will continue to operate. As the two pinions K K' revolve in opposite directions, it will readily be seen that when the apron is moved toward one end of the frame D one of the pinions, T or T', at its end is thrown in gear with the pinion K or K'; but as these pinions K and K' revolve in opposite directions, the apron will be made to travel either toward the right or the left hand side, as the operator may desire. When the apron is moved by the lever S toward the grain-board U on the right side of the machine, the pinions K T will be in gear, and the apron will travel toward the opposite end of the frame, and the cut grain will then be dropped over the left end of the frame. When, however, the apron is moved away from the grain-board U to put the pinions K' T' in gear, there is a space left on the right side of the machine, between the end of the apron and the grain-board, sufficiently wide for the cut grain to fall through upon the ground just inside of the wheel E on the grain side of the frame. The lever S, by which this apron is moved back and forth, also serves for raising and lowering the front part of the machine. For this purpose the rear end of the frame D, upon which the lever S is pivoted, has fastened to it a spring-catch of any kind, which engages with the ratchet-bar C. From this spring-catch extends the connecting-rod, which is fastened to a hand-lever pivoted under the operating-lever S. The operator, standing upon the board V upon the rear end of the tongue, guides the machine by means of the wheel B, and at the same time reverses the position of the apron R and raises and lowers the front end of the machine at will. By thus having a single lever to reverse the apron and to raise and lower the front of the machine, so as to regulate the distance the cutter shall run from the ground, the construction of the machine is greatly simplified and its cost correspondingly cheapened.

The object in having the apron R movable laterally, and providing a mechanism at each of its ends for the purpose of reversing its movement according to the position in which it is placed, is to deposit the swath upon the ground with the next preceding swath, and thus save one-half the travel required to gather them up, either by means of the combined hay rake and loader or by manual labor. The first time the machine goes over the ground the swath is deposited next to the standing grain. The next time the machine comes around the apron R is changed to the opposite side of the machine and made to run in the opposite direction from what it did when the machine passed over the ground the first time, and thus the second swath is deposited either upon the top or alongside of the first one. By this means, instead of having a swath for every width of the machine or for every time the machine goes around the field, there is a swath for only every double width or every second time the machine goes around the field; but this swath, of course, will be of a double size. By this means one-half of the travel required to gather the cut grain is saved.

Secured to each side of the frame are the perforated standards X, which serve as supports for the reel-supporting arms Y, and by means of which the reels can be raised and lowered at will. At each end of the frame the reel-supporting arm is provided with a triangular-shaped frame carrying the three chain-wheels Z, around which pass the endless chains A'. Each of these triangular frames is provided with a guide, B', which extends down the front, around the front corner, and along the bottom of the frame a suitable distance, and serves to hold the rake-teeth bars in position. The combined rake and reel bar C' is provided with a guide-arm, D', at each end, for coming in contact with the guides B' and holding the rake-teeth in position while they are entering into the grain and until they have moved the grain back to a certain point. The endless chains A' have each attached to them a bearing for the rake-rod, and in this bearing is cut a suitable slot, through which passes a projection from the rod, which projection and slot serve the purpose of limiting the distance the rod shall turn in its bearings. As long as the arms D' are in contact with the guides B' the teeth of the rake are held in the proper position to operate upon the grain for the purpose of moving it back upon the apron R; but after the rake C' has moved far enough backward for its arms D' to become freed from the guides, the rake turns backward, so as to no longer affect the grain, and the teeth are lifted upward out of contact with it. As this combined rake and reel descends its teeth pass vertically out into the grain, and then assume the proper position for moving it back upon the board. By the use of the upper chain-pulleys the teeth on the combined rake and reel are guided vertically, or nearly so, down into the grain. By this vertical movement the combined rake and reel teeth are made to descend into the standing grain in such a manner as not to strike those stalks of grain which it does not gather, and thus uselessly knock out the grain upon the ground, as is the case where the reel is made to strike the heads of those stalks that it does not gather in its movement. Any desired number of these toothed bars may be used, and each bar will form a part of the combined rake and reel, as shown.

Having thus described my invention, I claim—

1. In a reaper, an apron or carrier frame, in combination with means for giving it an endwise movement or adjustment, so that it can be moved toward either side of the main frame, substantially as shown.

2. In a reaper, the combination of a carrier or apron frame having an endwise movement with means for moving it, and a mechanism at each end for reversing the motion of the apron, substantially as described.

3. In a reaper, the combination of the main frame, supported upon wheels at its rear end, with a carrier or apron frame having an endwise movement or adjustment, and a lever which serves both to adjust the apron and to raise the main frame at its front end, substantially as set forth.

4. The combination of the main frame supported upon suitable driving-wheels, a mechanism connected to one of the wheels for both operating the cutter and driving the endless carrier or apron, and a second mechanism placed upon the opposite side of the frame and made to move in an opposite direction from the one that is connected directly with the driving-wheel, and the carrier-frame having an endwise movement or adjustment and provided with a driving pinion or wheel at each end, substantially as specified.

5. The combination of the frame D, the toothed driving-wheel E, shaft I, provided at its ends with pinions H K and crank J, and the driving-pulley $K^2$, with the cross-belt N, pulley O, shaft Q, pinion K′, the carrier-frame provided with apron, rollers having the pinions T T′, and the lever for moving the carrier-frame, substantially as shown.

6. In a combined rake and reel, the chains A, the rake-heads C′, attached thereto, and provided with guide-arms at their ends, in combination with the supporting-frame, the pulleys Z, and the guides B′, arranged at the corner of said frame, substantially as set forth.

7. In a combined rake and reel, the combination of the triangular frames, the guides attached to their front and lower sides, the endless chains, and the rake-heads attached thereto, and having the arms adapted to engage said guides, whereby the teeth of the rake-heads are made to enter vertically into the grain, substantially as shown.

In testimony whereof I affix my signature in presence of two witnesses.

DAVID WILLIAM BOVEE.

Witnesses:
J. W. GARNER,
GEO. B. READ.